US010546385B2

(12) United States Patent
Indelman

(10) Patent No.: US 10,546,385 B2
(45) Date of Patent: Jan. 28, 2020

(54) SYSTEM AND METHOD FOR IMAGE CAPTURE DEVICE POSE ESTIMATION

(71) Applicant: Technion Research & Development Foundation Limited, Haifa (IL)

(72) Inventor: Vadim Indelman, Haifa (IL)

(73) Assignee: Technion Research & Development Foundation Limited, Haifa (IL)

( * ) Notice: Subject to any disclaimer, the term of this patent is extended or adjusted under 35 U.S.C. 154(b) by 349 days.

(21) Appl. No.: 15/440,092

(22) Filed: Feb. 23, 2017

(65) Prior Publication Data
US 2017/0249751 A1    Aug. 31, 2017

Related U.S. Application Data

(60) Provisional application No. 62/299,579, filed on Feb. 25, 2016.

(51) Int. Cl.
*G06T 7/73* (2017.01)
*G06T 7/60* (2017.01)
(Continued)

(52) U.S. Cl.
CPC ............... *G06T 7/73* (2017.01); *G06K 9/52* (2013.01); *G06K 9/6201* (2013.01);
(Continued)

(58) Field of Classification Search
CPC .......... B60D 1/62; G01B 11/00; G01C 11/02; G01C 15/002; G01C 21/206; G01N 23/04;
(Continued)

(56) References Cited

U.S. PATENT DOCUMENTS 8,873,802 B2 * 10/2014 Kim .................. G06T 7/246
382/103
9,111,347 B2 * 8/2015 Ben Himane ............ G06T 7/75
(Continued)

FOREIGN PATENT DOCUMENTS

CN         103411587        8/2015

OTHER PUBLICATIONS

Kummerle, R., et al., "g2o: A General Framework for Graph Optimization," 2011 IEEE International Conference on Robotics and Automation, May 9-13, 2011, Shanghai, China.*

*Primary Examiner* — Xuemei G Chen

(57) ABSTRACT

A method for estimating a plurality of camera, comprising using at least one processor executing a code for: extracting a plurality of image features of a plurality of landmarks from a plurality of images captured by at least one camera from at least one pose, the plurality of landmarks calibrated with respect to a certain coordinate system; identifying among the plurality of image features at least one image feature documented in at least some of the images; producing scale values of at least one common image feature by analyzing the at least some of the images; determining a plurality of estimated poses of the at least one camera with respect to the certain coordinate system by using the scale values in calculating a minimal re-projection error between the plurality of image features and a plurality of predicted image features; and outputting the plurality of estimated poses.

20 Claims, 10 Drawing Sheets

(51) Int. Cl.
*G06K 9/62* (2006.01)
*G06K 9/52* (2006.01)

(52) U.S. Cl.
CPC .............. *G06K 9/6267* (2013.01); *G06T 7/60* (2013.01); *G06T 2207/30244* (2013.01); *G06T 2207/30248* (2013.01)

(58) Field of Classification Search
CPC ........ G01W 1/12; G06F 3/0488; G06F 3/061; G06K 9/00664; G06K 9/228; G06K 9/2018; G06K 9/3233; G06K 9/6289; G06K 9/52; G06K 9/6267; G06K 9/6201; G06T 3/4038; G06T 7/579; G06T 7/593; G06T 7/73; G06T 7/60; G06T 2207/30248; G06T 2207/30244; H04N 1/19594; H04N 9/3194
USPC ................. 1/1; 348/218.1, 46, 50, 143, 167; 382/103; 358/479; 711/103
See application file for complete search history.

(56) References Cited

U.S. PATENT DOCUMENTS

| | | | | |
|---|---|---|---|---|
| 9,201,424 | B1 * | 12/2015 | Ogale | G06T 7/80 |
| 9,251,590 | B2 * | 2/2016 | Sharp | A63F 13/00 |
| 9,846,963 | B2 * | 12/2017 | Patkar | G06T 7/73 |
| 9,891,049 | B2 * | 2/2018 | Brown | G01C 11/02 |
| 9,921,067 | B2 * | 3/2018 | Fanselow | G01C 21/206 |
| 9,959,625 | B2 * | 5/2018 | Seetharaman | G06K 9/00208 |
| 9,984,301 | B2 * | 5/2018 | Dos Santos Mendonca | G06K 9/46 |
| 10,126,115 | B2 * | 11/2018 | Nakano | G01B 11/00 |
| 10,129,527 | B2 * | 11/2018 | Zhang | H04N 5/232 |
| 2002/0163582 | A1 * | 11/2002 | Gruber | G06T 3/4038 348/218.1 |
| 2013/0010068 | A1 * | 1/2013 | Tiernan | G06K 9/228 348/46 |
| 2013/0070094 | A1 * | 3/2013 | Majumder | H04N 9/3194 348/143 |
| 2013/0162785 | A1 * | 6/2013 | Michot | G06K 9/6289 348/50 |
| 2014/0347709 | A1 * | 11/2014 | Stafford | H04N 1/19594 358/479 |
| 2015/0143032 | A1 * | 5/2015 | Hashimoto | G06F 3/061 711/103 |
| 2015/0146015 | A1 * | 5/2015 | Sommerlade | G06F 3/0488 348/187 |
| 2015/0186745 | A1 * | 7/2015 | Martini | G06T 7/0008 345/633 |
| 2015/0302575 | A1 * | 10/2015 | Sun | G01W 1/12 382/103 |
| 2017/0017667 | A1 * | 1/2017 | Chen | G01N 23/04 |
| 2017/0067739 | A1 * | 3/2017 | Siercks | G01C 15/002 |
| 2017/0140540 | A1 * | 5/2017 | Yamamoto | G05D 1/0251 |
| 2017/0200307 | A1 * | 7/2017 | Saha | G06T 7/593 |
| 2017/0254637 | A1 * | 9/2017 | Nakano | G01B 11/00 |
| 2018/0161986 | A1 * | 6/2018 | Kee | G06K 9/00664 |
| 2018/0174311 | A1 * | 6/2018 | Kluckner | G06K 9/3233 |
| 2018/0181142 | A1 * | 6/2018 | Baran | B60D 1/62 |
| 2018/0189565 | A1 * | 7/2018 | Lukierski | G06T 7/579 |
| 2018/0268237 | A1 * | 9/2018 | Stanimirovic | G06K 9/2018 |
| 2019/0005718 | A1 * | 1/2019 | Zhou | G06T 7/80 |

* cited by examiner

US 10,546,385 B2

SYSTEM AND METHOD FOR IMAGE CAPTURE DEVICE POSE ESTIMATION

RELATED APPLICATION

This application claims the benefit of priority under 35 USC § 119(e) of U.S. Provisional Patent Application No. 62/299,579 filed on Feb. 25, 2016, the contents of which are incorporated herein by reference in, their entirety.

FIELD AND BACKGROUND OF THE INVENTION

The present invention, in some embodiments thereof, relates to computer vision, and more specifically, but not exclusively, to estimating a pose of an image capturing device.

There exist image capturing systems comprising an image capture device, for example a camera, where there is a need to estimate a pose of the camera in a coordinate system. Examples of coordinate systems are a world coordinate system and a coordinate system calibrated with a camera pose of a camera when capturing a first image. A camera pose is a combination of position and orientation of a camera relative to a coordinate system. For example, a camera pose x may be expressed as a pair (R, t), where R is a rotation matrix representing an orientation with respect to the coordinate system, and t is a translation vector representing the camera's position with respect to the coordinate system. Other possible representations of orientation are double-angle representations and tensors. Examples of such image capturing systems are medical systems comprising a camera inserted into a patient's body, for example by swallowing the camera, systems comprising autonomously moving devices, for example vehicles and robots, navigation applications and augmented reality systems. When a camera operates in unknown environments, without further information or sensors, estimation of a camera pose may involve three-dimensional (3D) reconstruction of a scene. This problem is known as "structure from motion" (SfM) and "simultaneous localization and mapping" (SLAM) in computer vision and robotics communities, respectively.

A scene has image features, also known as landmarks. An image of the scene captured by a camera, sometimes referred to as a camera view, has observed image features representing the scene's landmarks. Typically, camera pose estimation is solved using bundle adjustment (BA) optimization. A bundle adjustment optimization calculation aims to minimize re-projection errors across all available images and for all image features identified in the available images. A re-projection error for a landmark in an image is the difference between the location in the image of the landmark's observed image feature and the predicted location in the image of the landmark's observed image feature for a certain camera pose estimate.

SUMMARY OF THE INVENTION

It is an object of the invention to provide a system and method for estimating a camera pose in a coordinate system.

The foregoing and other objects are achieved by the features of the independent claims. Further implementation forms are apparent from the dependent claims, the description and the figures.

According to a first aspect of the present invention, a method for estimating a plurality of image capture device poses comprises using at least one hardware processor executing a code for: extracting a plurality of observed image features of a plurality of landmarks from a plurality of images captured by at least one image capture device from at least one pose, the plurality of landmarks calibrated with respect to a certain coordinate system; identifying among the plurality of observed image features at least one observed image feature documented in at least some of the images; producing image feature scale values of the at least one common observed image feature by analyzing the at least some of the images; determining a plurality of estimated poses of the at least one image capture device with respect to the certain coordinate system by using the image feature scale values in calculating a minimal re-projection error between the plurality of observed image features and a plurality of predicted image features; and outputting the plurality of estimated poses. Adding scale information to the estimate computation increases the accuracy of the estimate.

According to a second aspect of the present invention, a system for estimating a plurality of image capture device poses comprises at least one hardware processor executing a code for: extracting a plurality of observed image features of a plurality of landmarks from a plurality of images captured by at least one image capture device from at least one pose, the plurality of landmarks calibrated with respect to a certain coordinate system; identifying among the plurality of observed image features at least one observed image feature documented in at least some of the images; producing image feature scale values of the at least one common observed image feature by analyzing the at least some of the images; determining a plurality of estimated poses of the at least one image capture device with respect to the certain coordinate system by using the image feature scale values in calculating a minimal re-projection error between the plurality of observed image features and a plurality of predicted image features; and outputting the plurality of estimated poses.

With reference to the first and second aspects, in a first possible implementation of the first and second aspects determining a plurality of estimated poses of the at least one image capture device with respect to the certain coordinate system comprises using a scale re-projection error term in a bundle adjustment optimization calculation. The scale re-projection error term is computed using the image feature scale information. Bundle adjustment optimization is a common method for computing pose estimates and adding a scale term increases the accuracy of the bundle adjustment optimization.

With reference to the first and second aspects, or the first possible implementation of the first and second aspects, in a second possible implementation of the first and second aspects the bundle adjustment optimization calculation comprises at least one cost function. The at least one cost function comprises at least one scale error term expressing a scale re-projection error using the image feature scale information. The bundle adjustment optimization calculation comprises: producing a plurality of image capture device pose sets, each of the plurality of sets comprising a plurality of estimated image capture device poses, each of the plurality of estimated image capture device poses associated with one of the plurality of images; producing a plurality of estimated costs by applying the at least one cost function to each of the plurality of estimated capture device pose sets; identifying a minimum estimated cost of the plurality of estimated costs; and selecting the estimated capture device pose set used to produce the minimum estimated cost. Minimizing a cost function is a common method to compute bundle adjustment optimization. Incorporating scale information in the cost function increases the accuracy of the cost function.

With reference to the first and second aspects, or the first and second possible implementations of the first and second aspects, in a third possible implementation of the first and second aspects producing a plurality of estimated image capture device pose sets comprises applying sparsity-aware iterative optimization techniques. The sparsity-aware iterative optimization techniques are members of a group comprising, but not limited to: g2o, Georgia Tech smoothing and mapping (gtsam) and Ceres Solver. Using sparsity aware iterative optimization techniques increases the efficiency of the production of the camera pose estimates.

With reference to the first and second aspects, or the first, second and third possible implementations of the first and second aspects, in a fourth possible implementation of the first and second aspects the at least one scale error term is computed. Computing the at least one scale error term comprises computing a difference between a measured image feature scale and a predicted feature scale. The measured image feature scale is calculated by a feature detector. The predicted feature scale is computed using an image capture device focal length, a distance from the common image feature's landmark to one of the plurality of estimated camera poses and a size estimate of the common image feature's landmark. Using measured image feature scale calculated by a feature detector allows increasing the accuracy of the pose estimate without additional cost for gathering other scale information.

With reference to the first and second aspects, or the first, second, third and fourth possible implementations of the first and second aspects, in a fifth possible implementation of the first and second aspects computing the predicted feature scale comprises: dividing the size estimate by the distance to produce a ratio and multiplying the ratio by the focal length. Computing a difference between a measured image feature scale and a predicted feature scale comprises subtracting the predicted feature scale from the image feature scale.

With reference to the first and second aspects, or the first, second and third possible implementations of the first and second aspects, in a sixth possible implementation of the first and second aspects the feature detector is Scale Invariant Feature Transform (SIFT). SIFT produces scale information so no additional processing is needed in order to collect scale information.

With reference to the first and second aspects, or the first, second and third possible implementations of the first and second aspects, in a seventh possible implementation of the first and second aspects computing the difference comprises calculating a Squared Mahalanobis Distance between the measured image feature scale and the predicted feature scale, having a measurement covariance matrix of a non zero-mean Gaussian distribution of noise elements in the image feature scale values. The Squared Mahalanobis Distance is simple and using it allows computing the pose estimate to be efficient.

With reference to the first and second aspects, or the first, second, third and seventh possible implementations of the first and second aspects, in an eighth possible implementation of the first and second aspects determining a plurality of estimated poses further comprises producing the measurement covariance matrix by computing a covariance matrix of a zero-mean Gaussian distribution of the noise elements in the image feature scale values using methods as known to the art. Using noise elements in the image feature scale values produces a covariance matrix coordinated with the image feature scale values.

With reference to the first and second aspects, in a ninth possible implementation of the first and second aspects identifying among the plurality of observed image features at least one observed image feature is by applying image matching algorithms.

With reference to the first and second aspects, or the ninth possible implementation of the first and second aspects, in a tenth possible implementation of the first and second aspects the image matching algorithms include Scale Invariant Feature Transform (SIFT) and Random Sample Consensus (RANSAC). Using these methods allows collecting scale information as part of the image matching process.

With reference to the first and second aspects, in an eleventh possible implementation of the first and second aspects the image feature scale values are produced while identifying among the plurality of observed image features at least one observed image feature. Producing image feature scale values while identifying observed image features is more efficient than performing separate computation for identifying observed image features and producing image feature scale values.

With reference to the first and second aspects, in a twelfth possible implementation of the first and second aspects the certain coordinate system is a world coordinate system. World coordinate systems are commonly available, for example when Global Positioning System (GPS) is available.

With reference to the first and second aspects, in a thirteenth possible implementation of the first and second aspects the origin of the certain coordinate system is calibrated to a pose of one of the at least one image capture devices when capturing a first image of the plurality of images. Expressing camera poses in a coordinate system of the first image captured is useful when no GPS is available.

With reference to the second aspect, in a first possible implementation of the second aspect the system further comprises at least one digital storage hardware, electrically connected to the at least one hardware processor. The at least one digital storage may be used, for example, for storing images for the at least one hardware processor to use. Having at least one digital storage allows collecting many images and processing them.

With reference to the second aspect, in a second possible implementation of the second aspect the system further comprises at least one non-volatile data storage. The at least one hardware processor is connected to the at least one non-volatile data storage via a network. A processing devices or an image capture device composing the system may be smaller since the device may access storage via a network does not have to include storage within the device.

With reference to the second aspect, or the second possible implementation of the second aspect, in a third possible implementation of the second aspect the non-volatile data storage is a cloud database. Using a cloud database allows using one storage sub-system for many systems.

With reference to the second aspect, in a fourth possible implementation of the second aspect the image capture device is installed on a moving arm. Using an arm allows moving the image capture device in order to capture images from more than one pose without the need to mount the camera on a vehicle capable of movement.

With reference to the second aspect, in a fifth possible implementation of the second aspect the image capture device is installed on a vehicle. Installing the image capture device on a vehicle allows moving the image capture device in order to capture images from more than one pose.

With reference to the second aspect, or the fifth possible implementation of the second aspect, the vehicle is a member of a group including: an airplane, a drone, a helicopter, a floating vehicle, a motorized vehicle, a car, a bicycle, a motorcycle, an electric vehicle, a balloon, a blimp and a cart.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
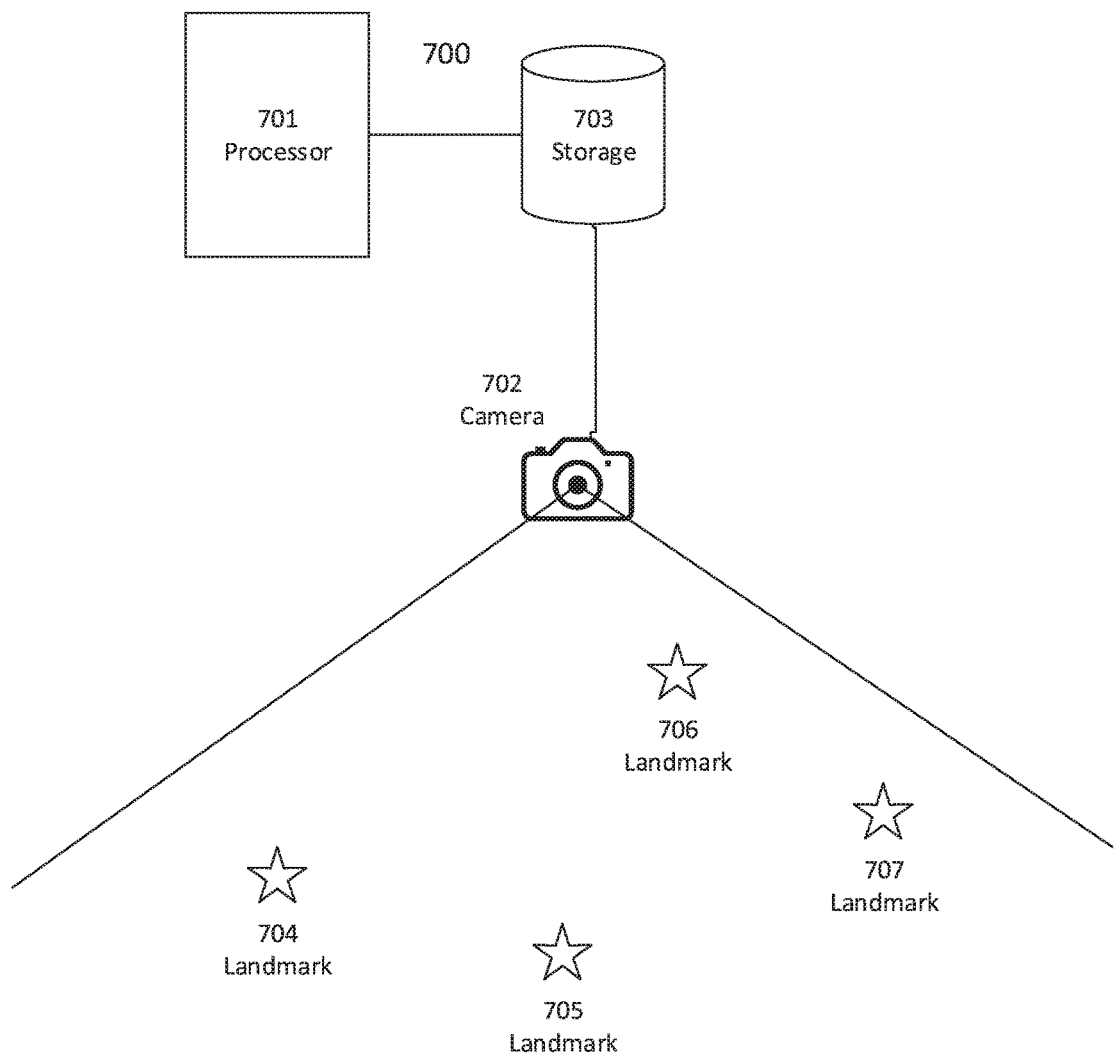
FIG. 1 is a schematic illustration of an exemplary system according to some embodiments of the present invention.

The present invention, in some embodiments thereof, relates to computer vision, and more specifically, but not exclusively, to estimating a pose of an image capturing device.

For brevity, the term "camera" is used to refer to an image capture device such as one or more image sensors, an independent camera, an integrated camera, and/or any sensor adapted to document objects visually.

A problem of estimating a pose of an image capture device in a certain coordinate system involving 3D reconstruction of a scene is known as "structure from motion" (SfM) and "simultaneous localization and mapping" (SLAM) in computer vision and robotics communities, respectively. A scene has image features, also known as landmarks. An image of the scene captured by a camera, sometimes referred to as a camera view, has observed image features, representing the scene's landmarks. Typically, camera pose estimation is solved using bundle adjustment (BA) optimization. Bundle adjustment is a common approach to recover (by estimation) camera poses and 3D scene reconstruction given a sequence of images and possible measurements from additional sensors. A bundle adjustment optimization calculation aims to minimize re-projection errors across all available images and for all landmarks identified in the available images. A re-projection error for a landmark in an image is the difference between the location in the image of the landmark's observed image feature and the predicted location in the image of the landmark's observed image feature for a certain camera pose estimate.

Hitherto, the terms "mapping an area" and "observing an area" both mean capturing images of the area by a camera, and are used interchangeably.

The following description refers to a moving camera but applies to stationary cameras as well. Estimating the motion of a camera is also known as ego-motion estimation.

Maintaining a high level of estimation accuracy over long periods of time is challenging in environments deprived of a Global Positioning System (GPS). Accuracy of estimations of camera poses and 3D structure for images captured over a period of time typically deteriorates over time due to accumulation of estimation errors. Estimation drift is the change in the accumulated estimation error over time. Estimation errors occur both when a camera re-observes previously mapped areas and when a camera continuously explores new areas. When a camera continuously observes new areas, bundle adjustment reduces to fixed-lag bundle adjustment which typically results in rapid trajectory drift; trajectory drift is the changes in the estimation of the camera's motion. Re-observation of an area is known as a loop-closure. When a camera re-observes previously mapped areas, estimation errors are typically reduced, but are still inevitable even in the case of a loop-closure, in large-scale environments.

Bundle adjustment optimizations consider constraints stemming from the same scenes observed in different images. In a typical bundle adjustment optimization for estimating a camera pose, a cost function is applied to a plurality of camera pose estimates with the purpose of identifying a camera pose with a minimal cost. Common cost functions in bundle adjustment optimizations use only image feature coordinates. Also additional related methods, for example image alignment methods, typically use only image feature coordinates. Image feature scale information is typically calculated by feature detection methods, for example Scale Invariant Feature Transform (SIFT), and are used in some feature matching methods, for example Random Sample Consensus (RANSAC).

The present invention, in some embodiments thereof, improves the accuracy of a camera pose estimation by using the image feature scale information in the cost function used in the bundle adjustment optimization calculation. In these embodiments, the present invention formulates scale constraints representing a relationship between a plurality of measured scale values. The plurality of measured scale values may be derived from image feature scale information of one or more observed image features representing the landmark. The one or more observed image features representing the landmark may be captured in one or more images (camera views). By introducing the scale constraints into a bundle adjustment optimization calculation the accuracy of camera pose estimation and 3D point estimation is improved. Furthermore, the present invention may facilitate a better ratio between a number of images used to calculate camera pose estimation and the accuracy of the resulting estimation than calculations made without the scale information. This is useful when the system is used in environments where detecting and tracking multiple image features is a challenging task, for example in low-contrast scenes and short track-life landmarks (that is, landmarks that are observed in only several images, where "several" means one or more.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention, in some embodiments thereof, allows improving the accuracy of a camera pose estimation by incorporating scale constraints into a bundle adjustment optimization calculation. In addition, the present invention may enable estimating a set of landmarks sizes, up to an overall scale.

Differences between first image feature scale information for an observed image feature of a landmark in one image and second image feature scale information for mother observed image feature of the landmark in another image depend on factors including camera poses, observed image features and unknown landmark sizes. Considering the dependence of image scale information on a camera pose by incorporating image feature scale information constraints into a bundle adjustment optimization calculation may reduce the error in a camera pose estimate.

In some embodiments of the present invention, a moving camera captures a sequence of N images from different and unknown camera poses. In such embodiments image i is an image captured by the camera from camera pose $x_i$, expressed in a certain coordinate system. L represents a set of landmarks, expressed in the certain coordinate system, and M is the number of landmarks. The landmarks represent three-dimensional scene points that generate two-dimensional observed image features. $Z_i$ represents a set of observed image features captured in the ith image, expressed in a camera coordinate system. The term $z^i_j$ is an observed image feature of landmark lj in image i, or the projection of landmark lj onto the camera plane in an image captured from camera pose $x_i$. A landmark has a size, representing the landmark's dimensions on the axises of the certain coordinate system. The term S represents the set of sizes of all landmarks and the term S represents the true size of landmark $l_j$. Thus:

$$X \stackrel{\text{def}}{=} \{x_1, \ldots x_N\},$$

$$x_i \in X,$$

$$L \stackrel{\text{def}}{=} \{l_1, \ldots l_M\},$$

$$l_j \in L,$$

$$Z_i \stackrel{\text{def}}{=} \{z_1^i, \ldots z_M^i\},$$

$$z_j^i \in Z_i,$$

$$Z \stackrel{\text{def}}{=} \{Z_1, \ldots Z_N\},$$

$$S \stackrel{\text{def}}{=} \{S_1, \ldots S_M\},$$

$$S_j \in S.$$

A maximum a posteriori (MAP) estimation of X, L and S is an estimate of unknown quantity sets X, L and S, given measurements Z. A MAP estimation of X, L and S may be given by:

$$X^*, L^*, S^* = \text{argmax } p(X,L,S|Z),$$

where the term X* represents a set of camera pose estimations. Calculating a MAP estimation of X, L and S produces a set of camera pose estimations given measurements Z.

The operator π(x,l) is a projection function for a standard pinhole camera model. Optionally, π(x,l) is applied to a camera pose $x_i$ and a landmark $l_j$ to project $l_j$ to image i. Operator π(x,l) may be described as first expressing landmark l in the camera coordinate system and next projecting to the image.

The term $z_j^i - \pi(x_i, l_j)$ is the re-projection error of landmark $l_j$ in image i, that is the difference between the location in the image $z_j^i$ the landmark's observed image feature and the predicted location in the image $\pi(x_i, l_j)$ of the landmark's observed image feature for camera pose $x_i$.

Variance is a measure of the variability or spread in a set of data. Covariance is a measure of the extent to which corresponding elements from two sets of ordered data move in the same direction. Variance and covariance are often displayed together in a variance-covariance matrix, also known as a covariance matrix. Variances appear along the diagonal of the covariance matrix and covariances appear in the off diagonal elements of the covariance matrix.

The term Σ represents a measurement covariance matrix showing the relationship between the set $Z_i$ of all observed image features in an image and a set of projections of all landmarks captured in the image.

The term $\|a\|^2_\Sigma$ is the Squared Mahalanobis Distance of a with measurement covariance matrix Σ, such that:

$$\|a\|^2_\Sigma \stackrel{\text{def}}{=} a^T \Sigma^{-1} a,$$

where T is the matrix transpose operator.

A term representing the likelihood of a coordinate measurement $z_i^j$ for landmark $l_j$ in an image captured from camera pose $x_i$ may be proportional to the inverse of the square root of the natural exponent of the Squared Mahalanobis Distance of the landmark's re-projection error, and may be written as:

$$p(z_i^j | x_i, l_j) \propto \exp[-\frac{1}{2}\|z_i^j - \pi(x_i, l_j)\|^2_\Sigma],$$

where exp is the natural exponential function.

The distance to landmark $l_j$ from camera pose $x_i$ is represented by $d_{i,j}$.

The term $s_{i,j}$ represents the observed image feature measured scale. The term f represents the focal length of the camera and $v_i$ represents measurement noise. Thus $s_{i,j}$ may be expressed as:

$$s_{i,j} = f \frac{S_j}{d_{i,j}} + v_i.$$

The measured noise may be modeled by a zero-mean Gaussian distribution with covariance matrix $\Sigma_{fs}$:

$$v_i \sim N(0, \Sigma_{fs}).$$

In some embodiments, $\Sigma_{fs}$ is produced by applying to the image feature scale values covariance computation methods known to the art.

The term $$s_{i,j} - f \frac{S_j}{d_{i,j}}$$

is the scale re-projection error of landmark $l_j$ in image i. A term representing the likelihood that a scale measurement $s_{i,j}$ for landmark $l_j$ in an image captured from camera pose $x_i$ may be proportional to the inverse of the square root of the natural exponent of the Squared Mahalanobis Distance of the landmark's scale re-projection error, and may be written as:

$$p(s_{i,j} | S_j, x_i) \propto \exp\left[-\frac{1}{2}\left\|s_{i,j} - f\frac{S_j}{d_{i,j}}\right\|^2_{\Sigma_{fs}}\right].$$

A joint probability distribution function (pdf), giving a probability that each of X, L and S falls in any particular range or discrete set of values specified for that variable, is represented by p(X, L, S|Z). The term $M_i$ represents a set of landmark indices captured in image i from pose $x_i$. Optionally, the joint pdf is factorized in terms of the coordinate measurement likelihood terms and the scale measurement likelihood terms:

$$p(X, L, S | Z) = \prod_i^N \prod_{j \in M_i} p(z_j^i | x_i, l_j) p(s_{i,j} | S_j, x_i),$$

where Π is the product operator. Optionally a term priors, representing other a priori information (not collected by the camera or derived from the information collected by the camera), is incorporated in the joint pdf:

$$p(X, L, S | Z) = \text{priors} \prod_i^N \prod_{j \in M_i} p(z_j^i | x_i, l_j) p(s_{i,j} | S_j, x_i).$$

For brevity, the following discussion refers to a joint pdf expressed without a priors term.

A non-linear least-squares cost function corresponding to the joint pdf represented in terms of the coordinate measurement likelihood terms and the scale measurement likelihood terms may be:

$$J(X, L, S) = \sum_{i}^{N} \sum_{j \in M_i} \|z_i^j - \pi(x_i, l_j)\|_{\Sigma}^2 + \left\|s_{i,j} - f\frac{S_j}{d_{i,j}}\right\|_{\Sigma_{f_s}}^2.$$

Calculating the MAP estimation of X, L and Z may be equivalent to minimizing the non-linear least-squares cost function corresponding to the joint pdf.

In some embodiments not all camera poses allow the camera to observe all the landmarks in L, making the problem of estimating a camera pose very sparse. Sparsity aware iterative optimization techniques may be applied to calculate the MAP estimation of X, L and Z. Examples of sparsity aware iterative optimization techniques are g2o, Georgia Tech smoothing and mapping (gtsam) and Ceres Solver.

Calculating the MAP estimation of X, L and Z may also produce set S* of estimates of landmark sizes.

Reference is now made to FIG. 1 showing a schematic illustration of an exemplary system 700 according to some embodiments of the present invention. In such embodiments, the system comprises a hardware 701 and a 702. Optionally, the system comprises one or more hardware processors and one or more cameras. The camera(s) are adapted to capture images of a scene with landmarks, for example landmarks 704, 705, 706 and 707. Optionally, the camera(s) are connected to data storage(s) 703 using a data connection such as a network connection. The data connection may be wired, for example an Ethernet network connection, or wireless, for example a Wireless Fidelity (Wi-Fi) network connection or a cellular network such as a GSM (Global System for Mobile Communications) network. In some embodiments the storage is a digital storage hardware electrically connected to the hardware processor(s). In other embodiments the storage is a non-volatile data storage, connected to the hardware processor(s) using another data connection. The other data connection may be wired, for example an Ethernet network, or wireless, for example a Wi-Fi connection or a cellular network such as a GSM network.

Optionally, the storage is a cloud database.

The camera(s) may send the plurality of images to the storage using the data connection and the hardware processor may retrieve the plurality of images from the storage using the other data connection. In embodiments comprising a network connection, the camera(s) may be connected to the hardware processor(s) using the network connection. In other embodiments the camera(s) may be connected to the hardware processor(s) using a direct electrical connection and may send the plurality of images to the hardware processor(s). In some embodiments the camera(s) is installed on one or more moving arms, for the purpose of moving the camera(s) from one place to another place. A moving arm is an apparatus comprising two or more segments connected by one or more joints. The one or more joints are connected to one or more motors. The one or more rotors may extend and rotate the two or more segments. The motors may be mechanical, pneumatic or hydraulic. The motors may be controlled by a computer. A computer controlled robotic arm is an example of a moving arm. Optionally, the camera(s) is installed on a vehicle. Examples of vehicles are: an airplane, a drone, a helicopter, a floating vehicle, a motorized vehicle, a car, a bicycle, a motorcycle, an electric vehicle, a balloon, a blimp and a cart. In some embodiments comprising a moving arm, the moving arm may be installed on a vehicle.

Figure 2:
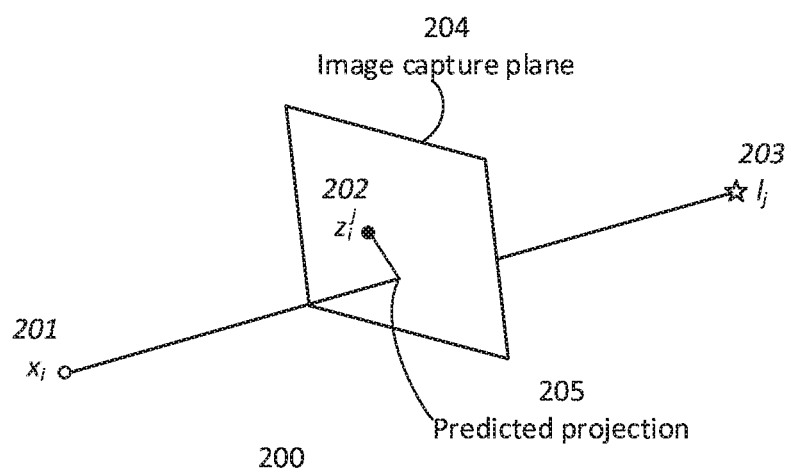
FIG. 2 is a schematic illustration of projecting a landmark to a camera view.

Reference is now made to FIG. 2, showing a schematic illustration 200 of projecting a landmark to a camera view, according to some embodiments of the present invention. In such embodiments, a camera captures a landmark $l_j$ 203 as an observed image feature $z_i^j$ 202 on an image capture plane 204. $x_i$ 201 is an estimated camera pose. In such embodiments, 205 is the predicted projection of landmark $l_j$ on the image capture plane if the image capture plane was captured from pose $x_i$. In such embodiments, the distance between the predicted projection and $z_j^i$ is the re-projection error of landmark $l_j$ in an image captured from estimated pose $x_i$.

Figure 3:
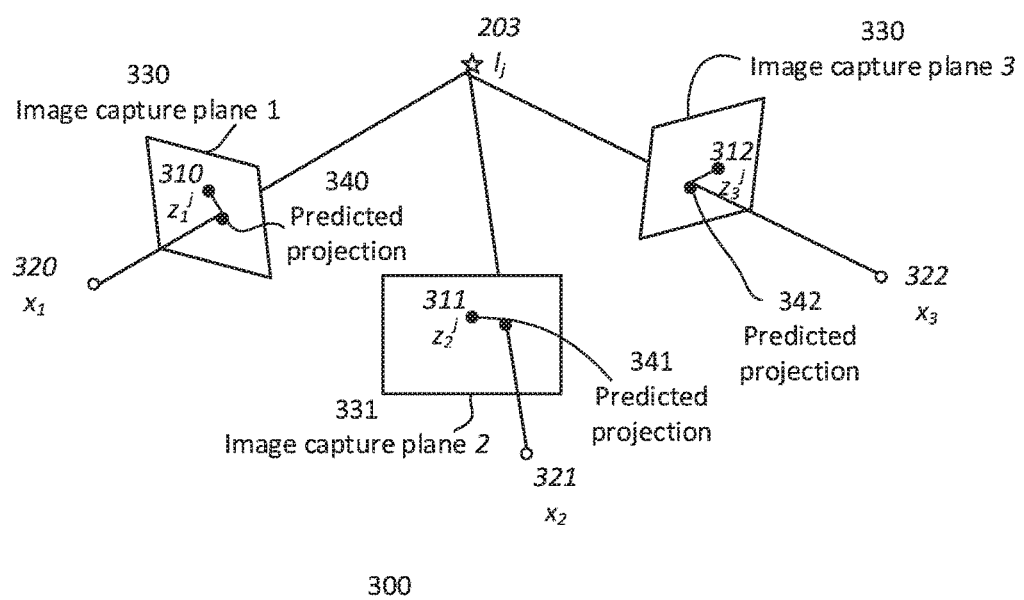
FIG. 3 is a schematic illustration of projecting a landmark to a plurality of camera views, according to some embodiments of the present invention.

Reference is now made to FIG. 3, showing a schematic illustration 300 of projecting a landmark to a plurality of camera views, according to some embodiments of the present invention. Optionally, a landmark $l_j$ 203 may be captured in a plurality of images, captured by at least one camera from a plurality of camera poses. In some embodiments, a camera captures a landmark $l_j$ 203 as observed image features $z_1^j$ 310, $z_2^j$ 311 and $z_3^j$ 312 on image capture planes 330, 331 and 332 respectively. $x_1$ 310, $x_2$ 311 and $x_3$ 312 may be estimated camera poses for capturing image capture planes 330, 331 and 332 respectively. In such embodiments, 340 is the predicted projection of landmark $l_j$ on the image capture plane if the image capture plane was captured from pose $x_1$, 341 is the predicted projection of landmark $l_j$ on the image capture plane when the image capture plane is captured from pose $x_2$; and 342 is the predicted projection of landmark $l_j$ on the image capture plane when the image capture plane is captured from pose $x_3$. In such embodiments, the distance between predicted projection 340 and $z_1^i$ is the re-projection error of landmark $l_j$ in an image captured from estimated pose $x_1$; the distance between predicted projection 341 and $z_2^i$ is the re-projection error of landmark $l_j$ in an image captured from estimated pose $x_2$; and the distance between predicted projection 342 and $z_3^i$ is the re-projection error of landmark $l_j$ in an image captured from estimated pose $x_3$.

Figure 4:
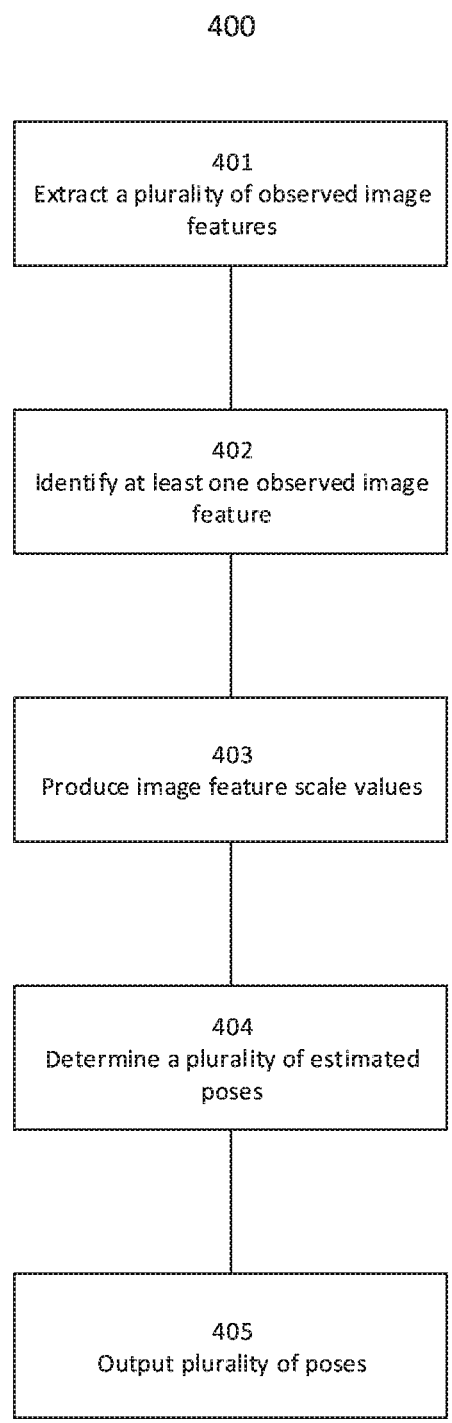
FIG. 4 is a sequence diagram of an optional flow of operations according to some embodiments of the present invention.

Reference is now made to FIG. 4, showing a sequence diagram of an optional flow of operations 400 according to some embodiments of the present invention. Such embodiments comprise at least one hardware processor and at least one camera. In such embodiments, the at least one hardware processor extracts 401 a plurality of observed image features of a plurality of landmarks from a plurality of images captured by the at least one camera from at least one pose. In such embodiments the at least one pose is unknown. There may be a need to compute a set of estimations for the at least one pose. Optionally, the observed image features may be expressed in a camera coordinate system.

In some embodiments the at least one hardware processor extracts the plurality of observed image features by applying image matching algorithms to the images. The image matching algorithms may include feature scale detection algorithms that produce scale information. Examples of image matching algorithms are SIFT and RANSAC. The at least one hardware processor may identify 402 among the extracted plurality of observed image features at least one common observed image feature documented in at least some of the images. Optionally, the image matching algorithms are used to identify the at least one common feature. The at least one hardware processor may produce 403 image scale values for the at least one common feature. Optionally, applying the image matching algorithms to the images produces the image scale values. The at least one hardware processor may use the image scale values to determine 404 a plurality of estimated camera poses. Optionally, the at least one hardware processor determines the plurality of estimated camera poses by calculating a minimal re-projection error between the plurality of observed image features and a plurality of predicted image features. In some embodiments the at least one hardware processor outputs 405 the plurality of estimated camera poses.

Figure 5:
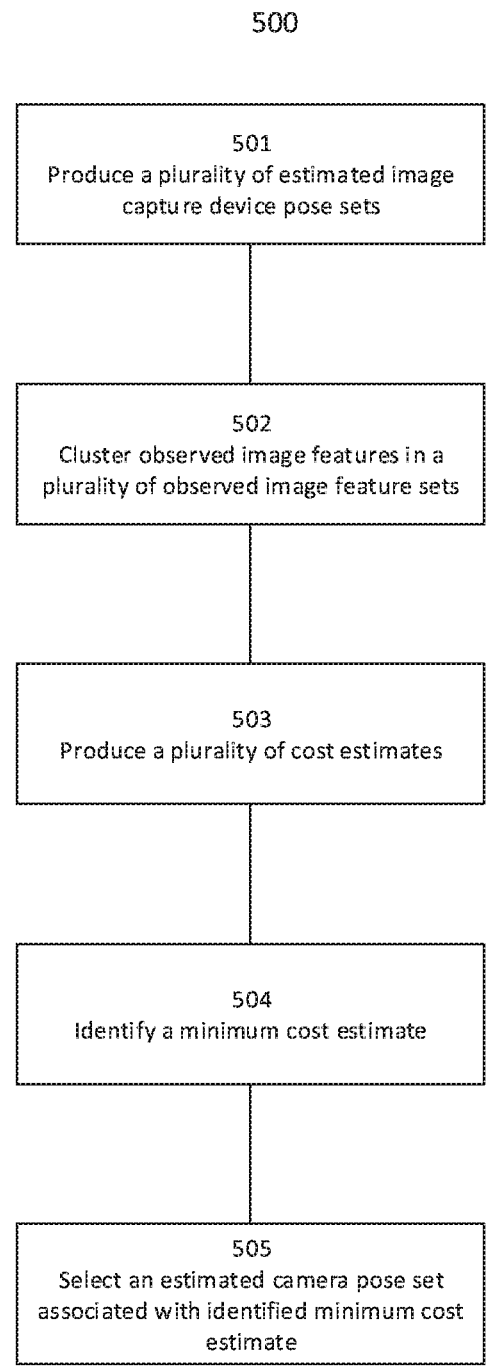
FIG. 5 is a sequence diagram of an optional flow of operations according to some embodiments of the present invention for determining a plurality of estimated poses.

Reference is now made to FIG. 5, showings a sequence diagram of a flow of operations 500 for determining a plurality of estimated camera poses, according to some embodiments of the present invention. In such embodiments, at least one hardware processor produces 501 a plurality of estimated camera pose sets. Each of the sets may comprise a plurality of estimated camera poses. The estimated camera poses may be expressed in a certain coordinate system. In some embodiments the certain coordinate system is a world coordinate system. In some other embodiments the certain coordinate system is relative to a certain known camera pose. Optionally, in each of the plurality of estimated camera pose sets each of the plurality of estimated camera poses is associated with one of the plurality of images. In such embodiments, each estimated camera pose set represents a joint estimate of the plurality of camera poses from which the plurality of images was captured. In 502, the at least one hardware processor may cluster the plurality of observed image features into a plurality of observed image feature sets. An observed image feature set may include some of the observed image features captured on one of the plurality of images. The at least one hardware processor may produce 503 a plurality of cost estimates by computing a cost estimate for each of the estimated camera pose sets.

Optionally, the at least one hardware processor uses the image scale values in computing the plurality of cost estimates. In 504 the at least one hardware processor may identify a minimum cost estimate of the plurality of cost estimates and may select 505 an estimated camera pose set associated with the identified minimum cost estimate.

Figure 6:
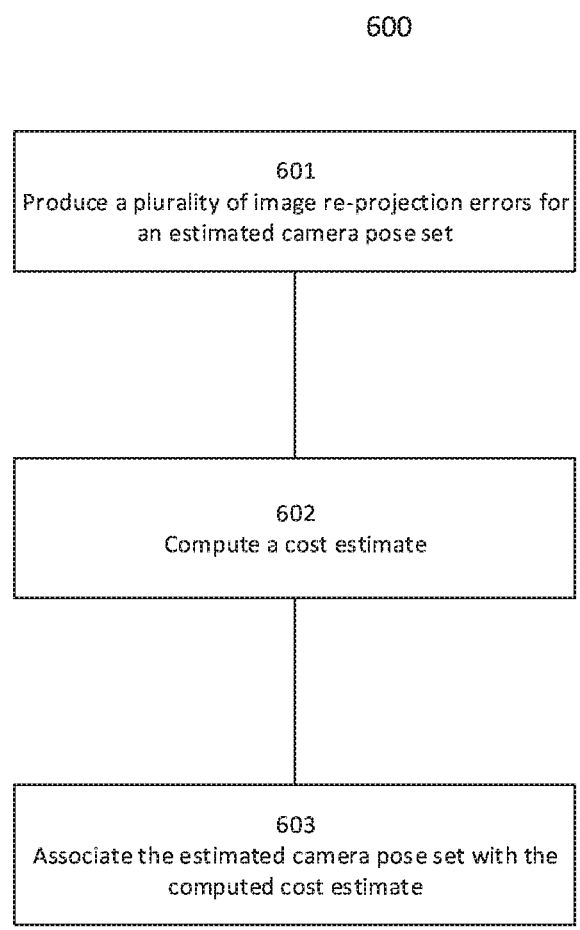
FIG. 6 is a sequence diagram of an optional flow of operations according to some embodiments of the present invention for computing a cost estimate for an estimated camera pose set.

Referring now to FIG. 6, showing a sequence diagram of a flow of operations 600 for computing a cost estimate for an estimated camera pose set, according to some embodiments of the present invention. In 601 the at least one hardware processor may produce a plurality of image re-projection error by computing an image re-projection error for each of the plurality of images. Optionally, the at least one hardware processor uses the image scale values in computing the plurality of re-projection errors. In 602 the at least one hardware processor may compute a cost estimate by summing the plurality of image re-projection errors and in 603 the at least one hardware processor may associate the estimated camera pose set with the computed cost estimate.

Figure 7:
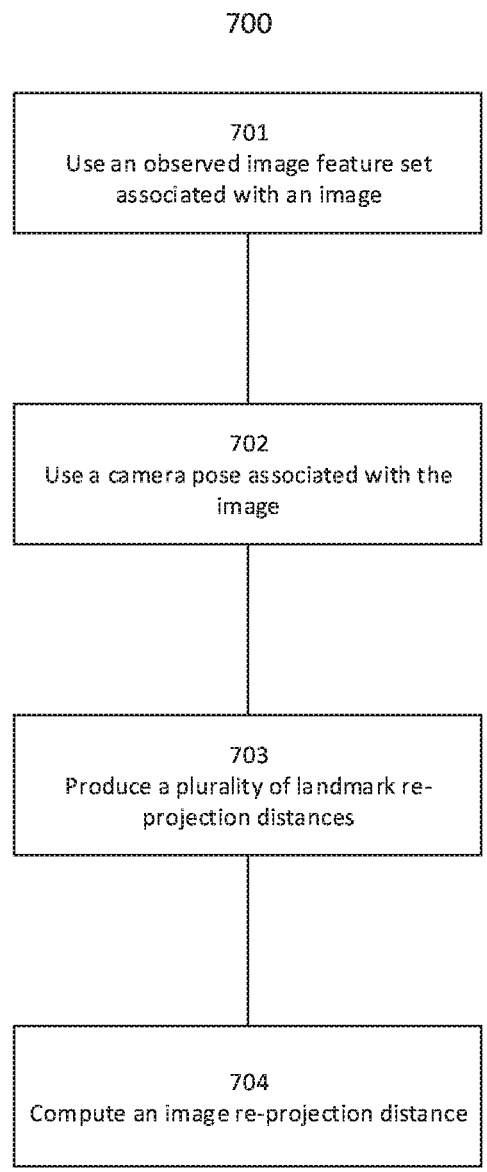
FIG. 7 is a sequence diagram of an optional flow of operations according to some embodiments of the present invention for computing an image re-projection error for an image.

Referring now to FIG. 7, showing a sequence diagram of a flow of operations 700 for computing an image re-projection error for an image, according to some embodiments of the present invention. The at least one hardware processor may use 701 one of the plurality of observed image feature sets. Optionally, the observed image features in the used set of observed image features were extracted from a certain image. The at least one hardware image may use an estimated camera pose associated with the certain image. In 703 the at least one processor may produce a plurality of landmark re-projection distances by computing a landmark re-projection distance for each of the observed image features in the used set of observed image features. Optionally, the at least one hardware processor uses the image scale values in computing the plurality of landmark re-projection distances. The at least one processor may compute 704 an image re-projection error for the image by summing the plurality of landmark re-projection distances.

Figure 8:
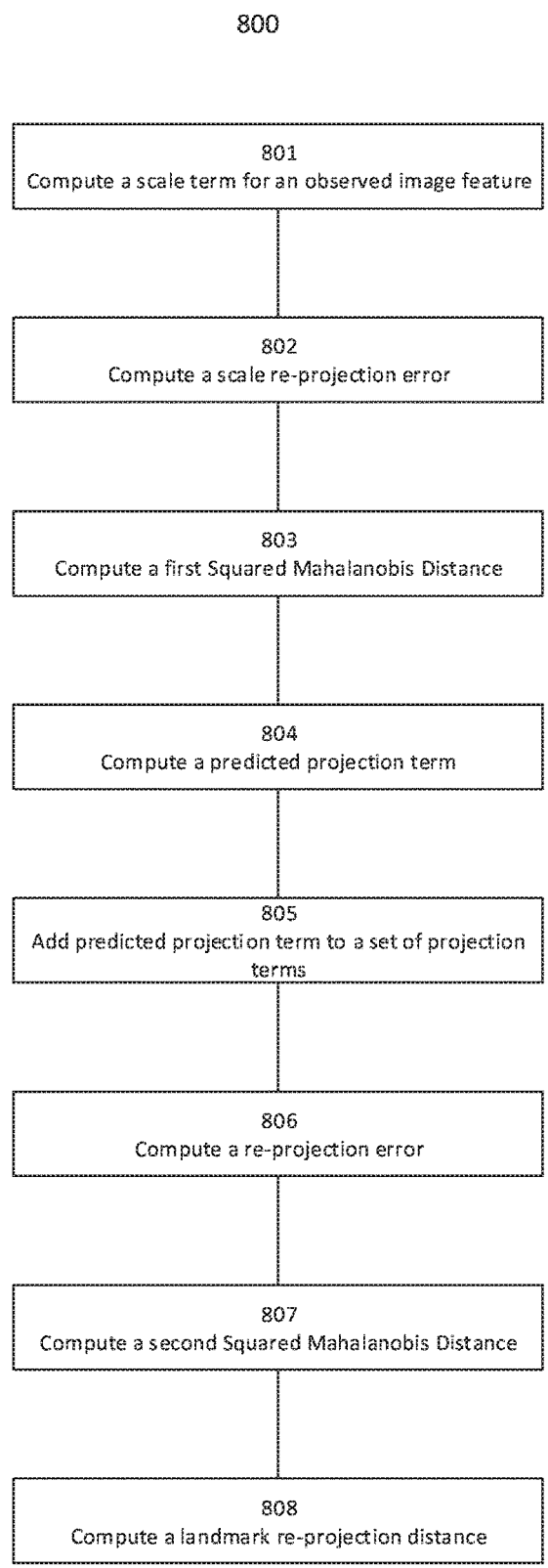
FIG. 8 is a sequence diagram of an optional flow of operations according to some embodiments of the present invention for computing a landmark re-projection distance for an observed image feature.

Referring now to FIG. 8, showing a sequence diagram of a flow of operations 800 for computing a landmark re-projection distance for an observed image feature in an image captured by a camera from an estimated camera pose using image feature scale information, according to some embodiments of the present invention. In such embodiments, the observed image feature is associated with a landmark captured by the camera in the image. The landmark may be expressed in the certain coordinate system. In such embodiments the landmark has a size. Optionally, if the landmark's size is unknown, a size estimate is used instead of a known size. The at least one hardware processor may compute 801 a scale term by multiplying a focal length f by the ratio between the landmark size and a distance between the estimated camera pose and the landmark. The at least one hardware processor may compute 802 a scale re-projection error by subtracting the computed scale term from an image feature scale value of the observed image feature. In 803 the at least one hardware processor may compute a first Squared Mahalanobis Distance for the scale re-projection error, having a first measurement covariant matrix $E_{fs}$. In some embodiments $E_{fs}$ is pre-defined. Optionally, $E_{fs}$ is determined by applying to the image feature scale values covariance computation methods known to the art, assuming the image feature scale values have a zero-mean Gaussian distribution. Optionally, $E_{fs}$ is determined by applying the covariance computation methods to noise measurements in the image feature scale values, assuming the noise measurements have a zero-mean Gaussian distribution.

In 804 the at least one processor may compute a predicted projection term by applying a projection operator $\pi$ to the estimated camera pose and the landmark to project the landmark to a camera coordinate system of the image. The at least one hardware processor may add 805 the predicted projection term to a set of computed predicted projection terms, to be used for other calculations, for example a second measurement covariant matrix $\Sigma$. Optionally, the observed image feature is expressed in the camera coordinate system of the image. The at least one hardware processor may compute 806 a re-projection error by subtracting the predicted projection term from the observed image feature. In 807 the at least one hardware processor may compute a second Squared Mahalanobis Distance of the re-projection error, having the second measurement covariant matrix $\Sigma$. In some embodiments $\Sigma$ is pre-defined.

Optionally, $\Sigma$ is determined by applying covariant computation methods known to the art to the set of computed predicted projection terms and a known or nominal expected measurement value. In 808 the at least one hardware processor may compute a landmark re-projection distance by summing the first Squared Mahalanobis Distance and the second Squared Mahalanobis Distance.

EXAMPLES

Reference is now made to the following examples which, together with the above descriptions, illustrate the invention in a non-limiting fashion.

A translation error is the difference between a translation component of an estimated camera pose and a translation component of an actual camera pose.

Figure 9A:
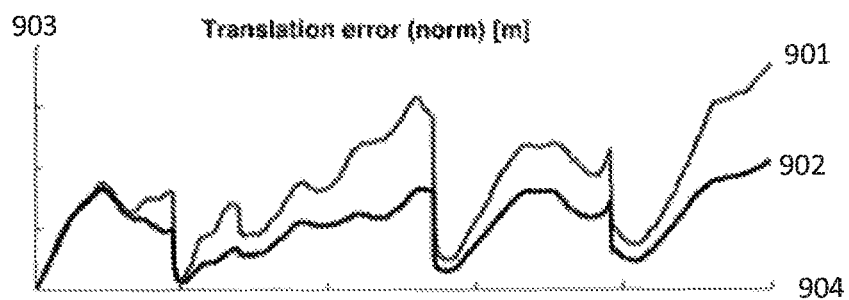
FIGS. 9A, 9B, 10A, 10B, 10C and 10D are graph representations of standard deviation of translation errors and standard deviation of rotation errors comparing bundle adjustment optimizations.
Figure 9B:
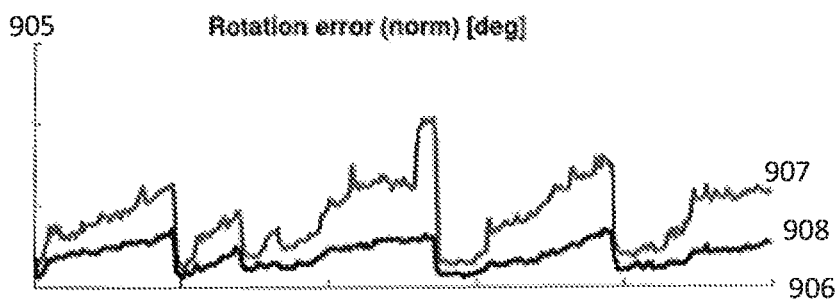

Referring now to FIGS. 9A and 9B, showing graph representations of standard deviation of translation errors and standard deviation of rotation errors comparing bundle adjustment optimization without image scale information and bundle adjustment optimization using image scale information obtained from a 50-run Monte-Carlo study. In this study, some images captured in a run include observed image features of landmarks observed in some other images captured in an earlier run.

FIG. 9A shows graph representations of standard deviations of translation errors. X-axis 904 represents the image index; y-axis 903 represents a standard deviation of distances in meters between observed image features and projected image features for a set of estimated camera poses. Graph 901 shows distance standard deviation values when computing a set of estimated camera poses using bundle adjustment optimization without feature scale information. The standard deviation values in graph 901 are higher than the values in graph 902, showing standard deviation of distances when computing the set of estimated camera poses using bundle adjustment optimization with feature scale information.

FIG. 9B shows graph representations of standard deviations of rotation errors. X-axis 906 represents the image index; y-axis 905 represents the normalized standard deviation of rotation differences in degrees between observed image features and projected image features for a set of estimated camera poses. Graph 907 shows rotation standard deviation values when computing a set of estimated camera poses using bundle adjustment optimization without feature scale information. The standard deviation values in graph 907 are higher than the values in graph 908, showing standard deviation of rotation differences when computing the set of estimated camera poses using bundle adjustment optimization with feature scale information.

Referring now to FIGS. 10A, 10B, 10C and 10D, showing graph representations of standard deviation of translation errors and standard deviation of rotation errors comparing bundle adjustment optimization without image scale information and bundle adjustment optimization using image scale information obtained from two pure exploration studies. In both studies feature noise scale was modeled as a Gaussian distribution $N(0, \Sigma_{fs})$ where covariance matrix $\Sigma_{fs}=0.01^2$.

Figure 10A:
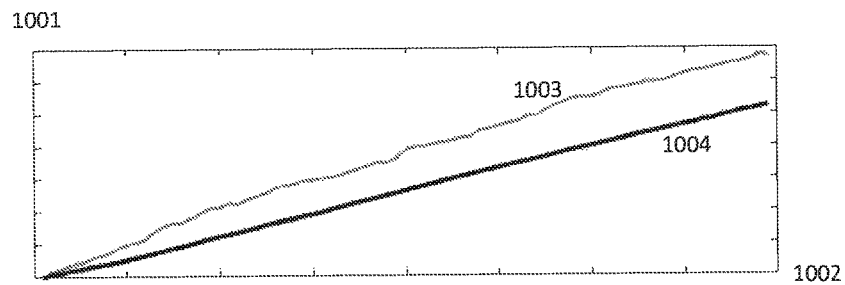

FIG. 10A shows graph representations of standard deviations of translation errors in a first pure exploration study. X-axis 1002 represents the image index; y-axis 1001 represents a standard deviation of distances in meters between observed image features and projected image features for a set of estimated camera poses. Graph 1003 shows distance standard deviation values when computing a set of estimated camera poses using bundle adjustment optimization without feature scale information. The standard deviation values in graph 1003 are higher than the values in graph 1004, showing standard deviation of distances when computing the set of estimated camera poses using bundle adjustment optimization with feature scale information.

Figure 10B:
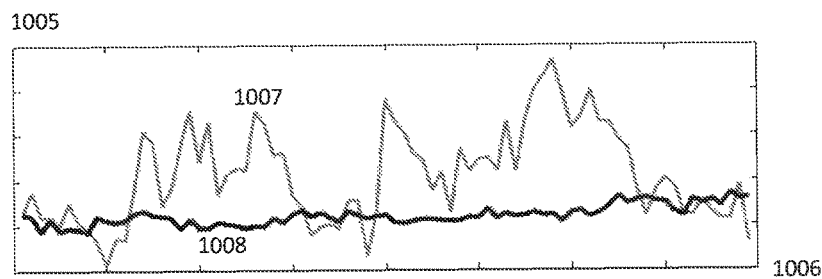

FIG. 10B shows graph representations of standard deviations of rotation errors in a first pure exploration study. X-axis 1006 represents the image index; y-axis 1005 represents the normalized standard deviation of rotation differences in degrees between observed image features and projected image features for a set of estimated camera poses. Graph 1007 shows rotation standard deviation values when computing a set of estimated camera poses using bundle adjustment optimization without feature scale information. The standard deviation values in graph 1007 are mostly higher than the values in graph 1008, showing standard deviation of rotation differences when computing the set of estimated camera poses using bundle adjustment optimization with feature scale information.

Figure 10C:
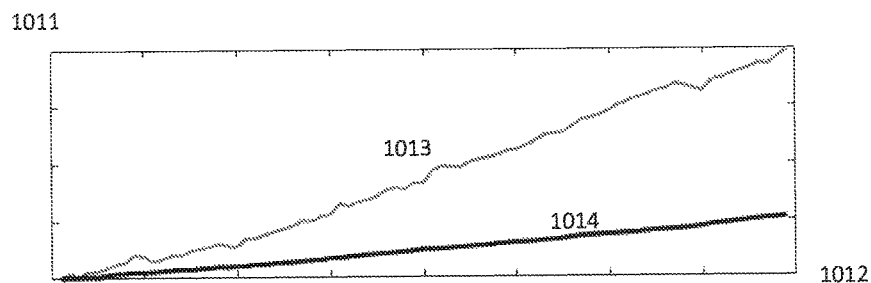

FIG. 10C shows graph representations of standard deviations of translation errors in a second pure exploration study. X-axis 1012 represents the image index; y-axis 1011 represents a standard deviation of distances in meters between observed image features and projected image features for a set of estimated camera poses. Graph 1013 shows distance standard deviation values when computing a set of estimated camera poses using bundle adjustment optimization without feature scale information. The standard deviation values in graph 1013 are higher than the values in graph 1014, showing standard deviation of distances when computing the set of estimated camera poses using bundle adjustment optimization with feature scale information.

Figure 10D:
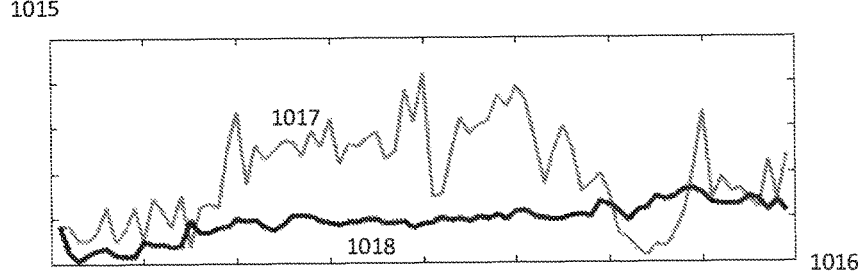

FIG. 10D shows graph representations of standard deviations of rotation errors in a second pure exploration study. X-axis 1016 represents the image index; y-axis 1015 represents the normalized standard deviation of rotation differences in degrees between observed image features and projected image features for a set of estimated camera poses. Graph 1017 shows rotation standard deviation values when computing a set of estimated camera poses using bundle adjustment optimization without feature scale information. The standard deviation values in graph 1017 are mostly higher than the values in graph 1018, showing standard deviation of rotation differences when computing the set of estimated camera poses using bundle adjustment optimization with feature scale information.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant feature detection methods and feature matching methods will be developed and the scope of the terms "feature detection method" and "feature matching method" is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for estimating a plurality of image capture device poses, comprising:
    using at least one hardware processor executing a code for:
        extracting a plurality of observed image features of a plurality of landmarks from a plurality of images captured by at least one image capture device from at least one pose, said plurality of landmarks calibrated with respect to a certain coordinate system;
        identifying among said plurality of observed image features at least one common observed image feature documented in at least some of said images;
        producing image feature scale values of said at least one common observed image feature by analyzing said at least some of said images;
        determining a plurality of estimated poses of said at least one image capture device with respect to said certain coordinate system by using said image feature scale values in calculating a minimal re-projection error between said plurality of observed image features and a plurality of predicted image features by using a scale re-projection error term in a bundle adjustment optimization calculation comprising at least one cost function which comprises at least one scale error term expressing a scale re-projection error using image feature scale information;
        wherein said at least one scale error term is computed by computing a difference between a measured image feature scale calculated by a feature detector, and a predicted feature scale computed using an image capture device focal length, a distance from said common observed image feature's landmark to one of a plurality of estimated camera poses and a size estimate of said common observed image feature's landmark; and
        outputting said plurality of estimated poses.

2. The method of claim 1, wherein said scale re-projection error term is computed using said image feature scale values.

3. The method of claim 2, wherein said bundle adjustment optimization calculation comprises:
    producing a plurality of estimated image capture device pose sets, each of said plurality of sets comprising a plurality of estimated image capture device poses, each of said plurality of estimated image capture device poses associated with one of said plurality of images;
    producing a plurality of estimated costs by applying said at least one cost function to each of said plurality of estimated capture device pose sets;
    identifying a minimum estimated cost of said plurality of estimated costs; and
    selecting the estimated capture device pose set used to produce said minimum estimated cost.

4. The method of claim 3, wherein said producing a plurality of estimated image capture device pose sets comprises applying sparsity-aware iterative optimization technique;
    wherein said sparsity-aware iterative optimization technique is a member of a group comprising: g2o, Georgia Tech smoothing and mapping (gtsam) and Ceres Solver.

5. The method of claim 4, wherein said feature detector is Scale Invariant Feature Transform (SIFT).

6. The method of claim 4, wherein computing said difference comprises calculating a Squared Mahalanobis Distance between said measured image feature scale and said predicted feature scale, having a measurement covariance matrix of a non zero-mean Gaussian distribution of noise elements in said image feature scale values.

7. The method of claim 6, further comprising producing said measurement covariance matrix by computing a covariance matrix of a zero-mean Gaussian distribution of said noise elements in said image feature scale values.

8. The method of claim 1,
    wherein computing said predicted feature scale comprises:
        dividing said size estimate by said distance to produce a ratio; and
        multiplying said ratio by said focal length; and
    wherein said computing a difference between a measured image feature scale and a predicted feature scale comprises subtracting said predicted feature scale from said measured image feature scale.

9. The method of claim 1, wherein said identifying among said plurality of observed image features at least one common observed image feature is by applying image matching algorithms.

10. The method of claim 9, wherein said image matching algorithms include Scale Invariant Feature Transform (SIFT) and Random Sample Consensus (RANSAC).

11. The method of claim 1, wherein said image feature scale values are produced while said identifying among said plurality of observed image features at least one common observed image feature.

12. The method of claim 1, wherein said certain coordinate system is a world coordinate system.

13. The method of claim 1, wherein the origin of said certain coordinate system is calibrated to a pose of one of said at least one image capture devices when capturing a first image of said plurality of images.

14. A system for estimating a plurality of image capture device poses, comprising:
at least one hardware processor executing a code for:
extracting a plurality of observed image features of a plurality of landmarks from a plurality of images captured by at least one image capture device from at least one pose, said plurality of landmarks calibrated with respect to a certain coordinate system;
identifying among said plurality of observed image features at least one common observed image feature documented in at least some of said images;
producing image feature scale values of said at least one common observed image feature by analyzing said at least some of said images;
determining a plurality of estimated poses of said at least one image capture device with respect to said certain coordinate system by using said image feature scale values in calculating a minimal re-projection error between said plurality of observed image features and a plurality of predicted image features by using a scale re-projection error term in a bundle adjustment optimization calculation comprising at least one cost function which comprises at least one scale error term expressing a scale re-projection error using image feature scale information;
wherein said at least one scale error term is computed by computing a difference between a measured image feature scale and a predicted feature scale;
wherein said measured image feature scale is calculated by a feature detector; and wherein said predicted feature scale is computed using an image capture device focal length, a distance from said common observed image feature's landmark to one of said plurality of estimated camera poses and a size estimate of said common observed image feature's landmark; and
outputting said plurality of estimated poses.

15. The system of claim 14, further comprising at least one digital storage hardware, electrically connected to said at least one hardware processor.

16. The system of claim 14, further comprising at least one non-volatile data storage;
wherein said at least one hardware processor is connected to said at least one non-volatile data storage via a network.

17. The system of claim 16, wherein said non-volatile data storage is a cloud database.

18. The system of claim 14, wherein said image capture device is installed on a moving arm.

19. The system of claim 14, wherein said image capture device is installed on a vehicle.

20. The system of claim 19, wherein said vehicle is a member of a group including: an airplane, a drone, a helicopter, a floating vehicle, a motorized vehicle, a car, a bicycle, a motorcycle, an electric vehicle, a balloon, a blimp and a cart.

* * * * *